United States Patent [19]
Wilson

[11] 3,815,219
[45] June 11, 1974

[54] PROCESS FOR DIFFUSION BONDING
[76] Inventor: Wendell B. Wilson, Spruce Dr., Rt. 2, Granville, Ohio 43023
[22] Filed: Mar. 30, 1971
[21] Appl. No.: 129,406

[52] U.S. Cl............. 29/488, 29/497, 29/498, 75/223, 148/20.6, 148/28
[51] Int. Cl............. B23k 1/20, B23k 31/02
[58] Field of Search............ 29/498, 495, 497, 488; 148/18, 20.6, 28; 75/223

[56] References Cited
UNITED STATES PATENTS

| | | | |
|---|---|---|---|
| 1,081,618 | 12/1913 | Madden | 29/421 |
| 2,352,246 | 6/1944 | Benner et al. | 75/223 X |
| 2,495,150 | 1/1950 | Von Deveter | 29/498 X |
| 2,957,232 | 10/1960 | Bartlett | 29/156.8 B X |
| 3,116,548 | 1/1964 | Andrus | 29/498 X |
| 3,158,515 | 11/1964 | Michael | 148/28 X |
| 3,495,323 | 2/1970 | Fournier | 29/498 X |
| 3,604,104 | 9/1971 | Glasgow | 29/498 X |

OTHER PUBLICATIONS

Brazing Manual, Prepared by American Welding Society Committee on Brazing and Soldering, Copyright 1963, pp. 108–109.
Garrett et al., "Brood Applications of Diffusion Bonding," NASA CR–409, pp. 19–22, 80–84, 137–141.

*Primary Examiner*—J. Spencer Overholser
*Assistant Examiner*—Ronald J. Shore
*Attorney, Agent, or Firm*—Ashlan F. Harlan, Jr.

[57] ABSTRACT

A process for diffusion bonding of metal parts (including particles) by immersion of the metal parts, or at least those portions thereof to be joined together, in a non-metallic, inorganic melt while the parts are in intimate contact, heating them to a temperature at which diffusion of the metal atoms at the surfaces of one or more of the parts takes place, and maintaining said heating for a period of time sufficient to provide a satisfactory bond. The melt, which may consist of a molten glass, one or more molten oxides, or one or more fused salts, protects the metal surfaces from oxidation and in many cases serves as a flux to dissolve surface films from the metal parts. It may also serve concurrently as a heat-treating bath. Pressure can be applied to immersed metal parts to improve the intimacy of their contact and two or more parts, after heating in the melt, may be withdrawn and while coated with and protected by the melt may be pressed, rolled or otherwise mechanically treated to improve the inter-metal contact and then reimmersed in the melt for further heating.

4 Claims, 4 Drawing Figures

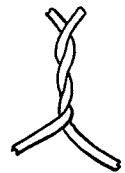
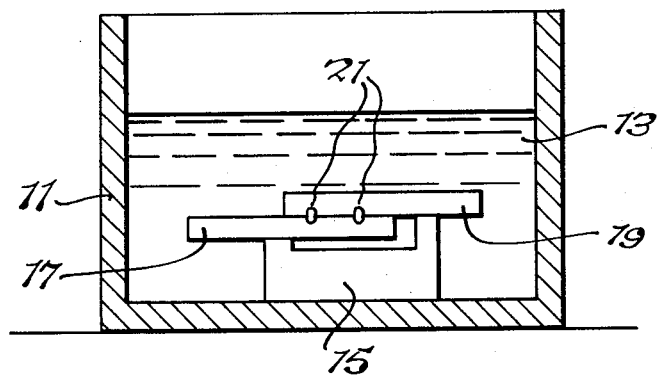
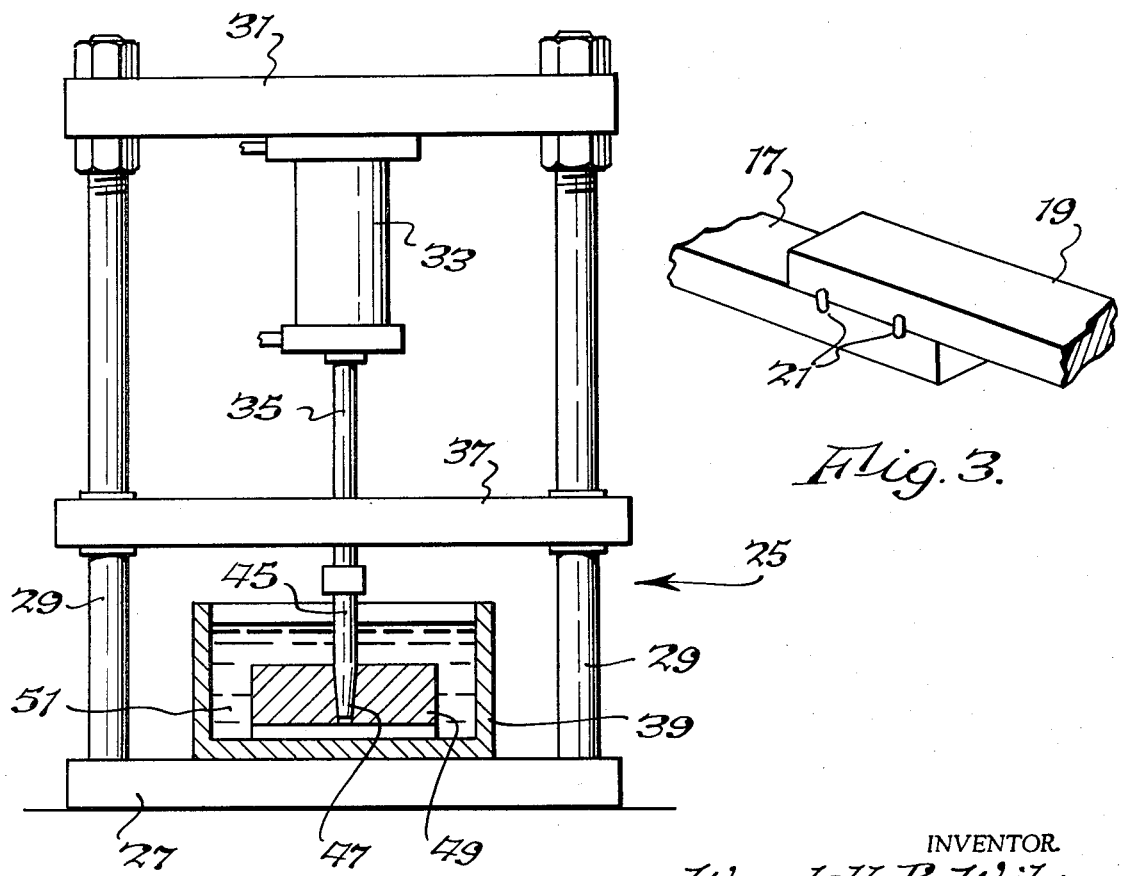

PROCESS FOR DIFFUSION BONDING

BACKGROUND OF THE INVENTION

This invention relates to bonding by diffusion and is particularly concerned with a process for the diffusion bonding of metals in non-metallic, inorganic melts with or without concurrent heat treatment of one or more of the metals.

Historically, metal pieces or parts have been joined mechanically, as by bolts or rivets; adhesively, as by the use of cements; by soldering or brazing; or by welding. Mechanical joining, although suitable for many purposes produces bulky joints which may loosen under stress. Adhesive joining is suitable for many low temperature uses but, again, the joints tend to be bulky and the adhesive is subject to deterioration by aging, heat, and chemical attack. Soldering and brazing produce relatively permanent joints which in some cases occupy little space but, like adhesive joints, such joints comprise a layer of alien material between the joined parts which may be weakened or destroyed by heat or chemical attack. Welding, although usually producing a permanent joint, is not entirely satisfactory for many purposes since some alien material, e.g., flux, may remain in the joint to cause or to facilitate corrosion and the localized high temperatures required in welding may change the metal characteristics at and near the joint and thus introduce stresses in or cause weakening of one or more of the parts that are welded together.

Because of the deficiencies of the traditional processes of joining metal parts, other methods have been developed. Outstanding among such methods is the diffusion bonding process in which the metal parts to be joined are held in intimate contact and heated to such a high temperature as to cause diffusion of the atoms of one or both metal parts into the other. In theory, the results of this process of joining metals are ideal. When both parts are composed of the same metal the joint will be substantially indetectable; and even with different metals the joint will generally be an alloy of the metals with a composition graduating from one to the other, thus making for stability. In practice, however, diffusion bonding has had disadvantages. Because of the tendency for most metals to acquire surface films of oxides or other compounds particularly when heated, the metal surfaces must not only be cleaned with extreme care but the heating must be done in an inert gas or, preferably, in vacuum to prevent further oxidation. Since the metal parts may require considerable force to hold them in sufficiently intimate contact to allow diffusion and this necessitates the use of presses or clamping arrangements, the evacuated chamber must be large and thus heating the parts to be joined is difficult. Heating the parts evenly is also difficult, if not impossible, with the result that unwanted stresses are placed on the joints.

SUMMARY OF THE INVENTION

The present novel process provides a way to avoid the previously found difficulties with diffusion bonding of metals and can be employed to produce good metal bonds easily and inexpensively.

Essentially the process comprises immersion of the metal parts to be joined, or at least those portions thereof to be joined, in a non-metallic, inorganic melt while the parts are in intimate contact, heating them to a temperature at which diffusion of the metal atoms at the surfaces of one or more of the parts takes place, and maintaining said heating for a period of time sufficient to provide a satisfactory bond. The melt, which may consist of a molten glass, one or more molten oxides, or one or more fused salts, protects the metal surfaces from oxidation and in many cases serves as a flux to dissolve surface films from the metal parts. It may also serve concurrently as a heat-treating bath. Obviously, the sintering of metal powders, particularly where no substantial amount of a liquid phase is formed, is a special case of diffusion bonding and may advantageously be carried on in a melt of the described type. As will be clear, the metal surfaces to be joined should be clean and of such character that they can be brought into very intimate or close contact.

SHORT DESCRIPTION OF THE DRAWING

FIG. 1 is a perspective view of a pair of twisted wires that have been joined by immersion diffusion bonding in accordance with the present invention;

FIG. 2 is a sectional view of a tank or crucible containing a melt in which are immersed a pair of tack- or spot-welded metal blocks to be bonded by diffusion;

FIG. 3 is an enlarged perspective view of the blocks shown in FIG. 2; and

FIG. 4 is a somewhat schematic view, partly in section, of apparatus for applying pressure to two interfitting metal parts while the parts are immersed in a melt for diffusion bonding in accordance with the invention.

DESCRIPTION OF EMBODIMENTS OF THE INVENTION

In FIG. 1 there is shown the result of a simple experiment, described in the following example, which illustrates the present novel process.

EXAMPLE 1

Two small pieces of clean nickel wire were twisted together tightly and immersed for 2 hours in a molten glass bath held at a temperature of about 900°C. The glass was formed of equimolar amounts of $Na_2O$, $Al_2O_3$, and $B_2O_3$. Upon removal of the twisted wires from the bath the residual glass thereon was dissolved with water and it was observed that the wires had been firmly joined together at their points of contact, obviously by diffusion.

EXAMPLE 2

The foregoing experiment was repeated using titanium wires. As with the nickel wires, the titanium wires were found to be diffusion bonded at the points where they were held in firm contact.

FIGS. 2 and 3 illustrate a procedure for diffusion bonding two metal blocks or small parts. In FIG. 2 there is shown a crucible or tank 11 of suitable resistant material such as graphite or fused-cast alumina which contains a non-metallic, inorganic melt 13. A suitable rack or support 15, also of suitable resistant material, is provided in the melt 13 for holding the metal plates 17 and 19 which it is desired to join. Heating of the melt 13 to maintain the desired temperature may be accomplished by any convenient and suitable means (not shown).

The general procedure for diffusion bonding with the apparatus illustrated in FIG. 2 is as follows: The metal blocks or other metal members that are to be joined are machined and/or ground to provide smooth, complementary surfaces on the contacting areas. They are then clamped together, assembled as desired in the finished product, under pressure to ensure firm contact of the meeting surfaces; and while thus held under pressure are temporarily fastened or tacked together by spot welds 21 on their adjoining edges. The members or parts thus fastened together are then immersed in the melt 13 and heated to a temperature at which metallic diffusion between the closely held parts takes place, being maintained at or above that temperature long enough for the parts to become firmly joined. The melt meanwhile serves to exclude air from the metal parts so that oxidation of the parts is prevented and may also serve as a flux to dissolve oxides or other surface reaction products from the metal parts.

The above-described process is further described in the following example as applied to the diffusion bonding of plates or blocks of a titanium-aluminum-vanadium alloy containing 6 percent aluminum and 4 percent vanadium.

EXAMPLE 3

A pair of plates or blocks, each approximately 51 mm × 17 mm × 8.5 mm, were surface finished by machining. The plates were then pressed together with the machined faces adjacent and spot welds were made across the adjacent edges of the plates to hold the adjacent faces in firm contact. The plates, thus fastened together, were then immersed in a melt formed of equimolar amounts of $Na_2O$, $Al_2O_3$, and $B_2O_3$ and held at a temperature of about 900°C for 20 hours.

The joined plates, upon removal from the bath, were water quenched, and the glass encrusting the plates was removed by dissolving it with water. Microscopic inspection of polished sections across the interface showed a homogenous structure throughout the pieces, the interface being marked only by a few pores. These pores resulted from the imperfect contact between the plates caused by use of a relatively coarse machined finish thereon.

It was evident from microscopic inspection of the joined plates that not only had diffusion taken place across the boundary between the contacting surfaces of the plates, but that there had also been such heat-treatment of the bonded plates during the immersion in the bath as to produce a homogeneity of grain structure throughout the joined plates. Obviously the resulting article had very desirable physical properties and lacked the stresses and intervening distinguishable layers or heat-affected zones that would have resulted from welding or other methods of joining the plates.

Many other experiments have been carried out which have demonstrated the feasibility of diffusion bonding of metals in non-metallic, inorganic melts or baths. With a melt or bath of suitable melting point the process can be applied to virtually any metal or combination of metals. Particularly important, of course, are iron and ferrous alloys such as steels, the non-ferrous reactive metals such as titanium and zirconium and their alloys, heat-resistant alloys such as those of nickel and chromium base alloys, and refractory metals such as tungsten, molybdenum, and tantalum. The parts or elements to be joined do not have to be the same in composition and, indeed, may be dissimilar metals. For example, ferrous alloys and titanium alloys are easily diffusion bonded by the present immersion process.

Widely different metals may be readily and conveniently joined by the process provided that serious adverse stresses, for example those resulting from great differences in coefficients of thermal expansion, are not encountered during cooling of the formed composite.

The melting point of the bath employed will determine the minimum temperature that can be used in a specific diffusion bonding application and the decomposition point or boiling point of the bath will determine the maximum temperature that can be used. However, there are available, as set forth below, a large number of melt compositions with various melting, boiling and decomposition points which will permit the use of desired temperatures in carrying out the process. In general, it is desirable to use temperatures in diffusion bonding according to the present process about midway between room temperature (25°C) and the melting point of the lowest melting of the metals involved. The choice of a suitable temperature in any particular instance will be determined not only by this factor but also by the effect of the heating on the properties and characteristics of the metals such, for example, as grain size, segregation and the like. In many instances the use of relatively high temperatures is desirable because of the resulting increased rate of diffusion.

Non-metallic, inorganic molten baths or melts for carrying out diffusion bonding in accordance with the present invention may vary in composition. Suitable materials comprise oxides and metallic salts. Among the oxides, particularly useful constituents of melts suitable for carrying out the present novel process are strongly basic oxides such as alkali metal oxides ($Na_2O$ and $K_2O$), alkaline-earth metal oxides (BaO, SrO, CaO, MgO), and the amphoteric and weak-acid forming oxides such as $Al_2O_3$, ZnO, $SiO_2$, $SnO_2$, and especially $B_2O_3$. It will be understood that these and others may be used alone or in various combinations depending upon the metals being bonded and the properties desired. Those skilled in the ceramic or glass art will have no difficulty in selecting the oxides and/or their proportions to obtain suitable melts for use with specific metals and alloys.

Many of the most useful mixtures of oxides form glasses when molten. A few of these are set forth in Table A but it will be recognized that there are many more which will be useful in at least some circumstances.

TABLE A

| Oxides | Molar Ratios |
| --- | --- |
| $Na_2O - Al_2O_3 - B_2O_3$ | 1 : 1 : 1 |
| $Na_2O - SiO_2 - B_2O_3$ | 2.52 : 1 : 1.52 |
| $K_2O - B_2O_3 - SiO_2$ | 1 : 2.11 : 1.73 |
| $BaO - B_2O_3$ | 1 : 0.64 |
| $Na_2O - Al_2O_3 - SiO_2$ | 1 : 0.185 : 4.55 |

The first mentioned of these glass compositions, i.e., $Na_2O$, $Al_2O_3$ and $B_2O_3$ in a 1:1:1 molar ratio, was employed as a melt or molten bath in the foregoing examples and is useful in many situations since it becomes molten at about 500°C and may be heated repeatedly to about 1,000°C without substantial adverse change in composition. In using glasses for melts in accordance with the invention the constituent oxides may be melted together for use or a preformed cullet may be melted.

As mentioned above, molten salts can also be used as baths for diffusion bonding of metals. Some such salts, such as the silicates of the alkali and alkaline-earth metals, are essentially glasses when molten. However, other salts may also be used. Examples are sodium and potassium halides such as fluorides and chlorides, sodium cyanide, potassium cyanide, potassium nitrite, and mixtures thereof. In general, any molten salt which is stable at the temperatures employed and non-reactive with the metal or metals immersed therein is usable for carrying out the process.

It will be understood that diffusion bonding of metals according to the present invention may be carried out in a variety of ways differing from the procedure described in the preceding examples. Thus, as depicted in FIG. 4, the metal parts to be joined may be subjected to pressure while in the melt or molten bath.

As shown in FIG. 4, an hydraulic press, comprehensively designated 25, is employed. The press has a base plate 27, supporting rods 29, a head plate 31 carried by said rods, a linear fluid motor 33 supported by said head plate and having an extensible, downwardly-extending piston rod 35 for applying force, and a guide plate 37 slidably mounted on the rods 29 for guiding the piston rod. A crucible 39, such as is shown in FIG. 2, is placed on the base plate 27 so that pressure can be applied to articles in said crucible.

EXAMPLE 4

In, for example, joining by diffusion bonding a titanium alloy shaft 45 having a tapered end 47 to a titanium alloy plate 49 having a tapered hole therethrough, the tapered end 47 and the interior of the hole are given smooth, complementary surfaces by suitable means. Then the plate is placed at the bottom of the crucible 39 with the larger end of the hole therein facing upwardly, the tapered end 47 of the shaft 45 is placed in the tapered hole of the plate and the piston rod 35 is projected by operation of the fluid motor 33 to exert pressure on the shaft to hold it firmly in place. A suitable melt 51, which may consist essentially of $Na_2O$, $Al_2O$, and $B_2O_3$ in equimolar proportions, is then established in the crucible 39 in an amount at least sufficient to cover the plate 49 and the lower portion of the shaft 45 and the latter is held in place under pressure from the fluid motor 33 for sufficient time for diffusion bonding to take place thereby securing the shaft 45 and plate 49 firmly together.

Because of the relatively viscous nature of some molten baths another method of carrying out a diffusion bonding of metal parts to be joined is possible and desirable in many instances. This involves assembling the parts to be joined, employing tack welding, clamping, or other suitable means to hold them together in proper relation. The assembly is then immersed in a suitable melt where the parts reach a temperature at which diffusion bonding can take place. The assembly is then removed from the bath, a coating of the material of the melt adhering to and covering the surface thereof, and while still hot and thus more readily deformable is subjected to a desired mechanical treatment such, for example, as pressing or rolling, to ensure intimate contact of the surfaces between which diffusion bonding is desired. Following this, the assembly is returned to the molten bath and reheated for such time as to permit diffusion bonding of the parts. The metal is protected from oxidation during the mechanical treatment by the adherent coating referred to. In some cases, of course, the initial heating step may be short if the desired mechanical treatment of the metal parts can be carried out at temperatures below those desired for diffusion bonding.

Still another method of ensuring good diffusion bonding of metal parts or elements in accordance with the present invention is to employ, for maintaining the parts in properly assembled position, fastening or clamping means which is made operative by differential thermal expansion of the parts and clamping means as the temperature is raised to increase the force holding the parts together. For example, the parts may be riveted together, after the contacting surfaces are finished and cleaned, with rivets of a metal of high melting point which has a lower coefficient of thermal expansion than the parts to be joined. Thus, as the parts are heated in the melt, the expansion of the parts will increase the clamping force exerted by the rivets. Specifically, rivets of molybdenum, a metal having a coefficient of thermal expansion of approximately $3 \times 10^{-6}$ in./in./°F., may be employed to clamp together sheets, bars, or other parts of steel having a coefficient of thermal expansion of about $8 \times 10^{-6}$ in./in./°F.

It will be evident from the foregoing description that the surfaces of the metal parts to be joined should be clean and well finished and have complementary surfaces since interdiffusion is thereby facilitated. It will also be necessary to select a suitable composition for the melt, bearing in mind that the molten bath should be non-corrosive to the metal parts as well as have a molten range that includes the temperature desired for the bonding, and also for heat treatment, if the latter is desired. It will further be understood that the rate of diffusion is a function of time as well as temperature, the two factors having inverse effects, i.e., other factors being the same, the higher the temperature the shorter the time required to obtain bonding by diffusion, and vice-versa. Consequently, it is not feasible to establish limits for one or the other alone. It should be here noted, however, that, while with clean surfaces diffusion at contacting metal surfaces takes place slowly even at relatively low temperature, the rate of diffusion increases rapidly with increasing temperature. Consequently, the use of the highest temperature for the molten bath which is feasible in the light of other considerations, such, for example, as stability, adverse effects on the structure of one or more of the metals used, or undue corrosion of the container, is usually preferred.

The crucible or container for the molten heating bath may be formed of any suitable material, such materials being well known, and may have any suitable construction, it being evident that small containers may be of materials and construction unsuited practically for large ones. In some cases metal crucibles may be used, with or without water cooled walls. Also useful in many cases are crucibles of graphite or carbon and refractories, particularly fused-cast refractory materials such as $Al_2O_3$ and stabilized $ZrO_2$. Such refractory materials may also be used as linings for metal shells and for forming other auxiliary elements, such as the support 15, which may be in contact with the melt. The materials for the molten bath may be melted in the crucible or, alternatively, may be melted in another container and transferred to the crucible. Heating of the melt, or the materials therefor, in the crucible or elsewhere can be by any suitable known procedure and/or means, these constituting no part of the present invention.

The present novel method for diffusion bonding of assemblies of metal parts presents numerous advantages over previously practiced methods of joining metal parts. For example, the parts will not separate as may occur when a soldered or brazed assembly is heated above the melting point of the bonding material and there is neither a sharp change of structure nor an embrittled zone in the finished article such as may occur with welded structures. Moreover, in comparison with diffusion bonding in vacuum or an inert atmosphere, not only is the apparatus required less expensive, but pressure may also be readily applied even to large assemblies since, as disclosed above, assemblies can be removed from the molten bath after being heated and subjected to compacting procedures such as rolling or pressing while the metal is protected from oxidation by an enclosing mass of viscous material from the bath.

As pointed out above, the sintering together of metal particles such as metal powders or fibers, including whiskers, where no substantial amount of a liquid phase is formed is a special case of diffusion bonding and such sintering may be conveniently and satisfactorily carried out by processes embodying the principles of the present invention, the metal particles being regarded as very small parts, analagous to the larger parts or elements the diffusion bonding of which has been described above. In some cases, a preformed compact of the metal powder, with or without a suitable auxiliary container, may merely be held in a suitable melt such as described above at such temperature and for such a time as to obtain adequate sintering together (diffusion bonding) of the metallic particles. In other cases it may be desired or necessary to either remove the compact from the melt or molten bath after preliminary heating and further compress it or to exert pressure on the compact during the heating in the melt. In the former situation the encrusting material of the melt which remains on the compact when it is removed from the bath protects the metal powder from oxidation during compression. In the latter situation pressure applying means such as is shown in FIG. 4 or any other suitable means may be employed. In either situation a suitable mold may be used if desired. Other known sintering procedures may also be employed as desired and feasible. Obviously, as with diffusion bonding of larger parts or elements, the present method has the advantage of protection from oxidation during the heating necessary to obtain the desired diffusion and during any subsequent heat treatment in the molten bath.

In a variation of the above-described sintering procedure composites or cermets may be produced in which at least a portion of the pores of a porous body formed by sintering a mass of metal powder and/or metal fiber according to the present invention remain filled with the oxide or glass used in the molten bath. Such products may be formed by cooling the sintered body without permitting the molten oxide or glass entrapped in the pores to separate or run out. If desired, of course, the hot porous body with entrapped glass or oxide may be shaped after removal from the molten bath by, for example, pressing in a suitable mold.

In the foregoing description it has been noted as a further advantage of the invention that the non-metallic, inorganic melt or molten bath employed for diffusion bonding is also useful in the heat treatment of the joined metal parts. It will be evident that heat treatment of metal articles in conjunction or simultaneously with diffusion bonding has economic advantages. Those skilled in the art will understand that such heat treatment can be varied by choice of melt temperatures and, if desired, by changing the temperature of the bath before, during, or after the diffusion bonding. As indicated above, the diffusion bonded parts or elements may be quenched after removal from the melt. Instead, however, they may be air cooled, annealed, or otherwise treated in accordance with schedules and procedures known in the art to achieve the desired physical characteristics and metallographic structure. In the event annealing is desired, allowing the bonded article to cool in the melt will in some cases be desirable and feasible.

Terms of position or direction, such, for example as upper, lower, top, bottom, right and left as used herein refer to the illustrations in FIGS. 2 and 4 and are used only for convenience in description. Such terms should not be construed as limiting the scope of this invention or as requiring or implying a necessary positioning of the structure or portions thereof.

I claim:

1. A process for diffusion bonding, in the absence of any substantial amount of a liquid metal phase, of an assembly of metal parts, said parts being both held in intimate contact and pressed together essentially only by mechanically applied pressure, which comprises preheating said assembly in a suitable, non-metallic, inorganic melt at atmospheric pressure, removing said assembly from said melt, pressing said parts together while hot and coated with the melt material, the coating of melt material protecting said assembly of metal parts from oxidation, reimmersing said assembly in said melt, and further heating it therein at atmospheric pressure to a temperature at which interdiffusion between said parts takes place for a period of time sufficient to provide a satisfactory bond.

2. A process as set forth in claim 1 in which said melt consists essentially of one or more oxides or a glass.

3. A process as set forth in claim 1 in which said melt consists essentially of fused salts.

4. A process for diffusion bonding, in the absence of any substantial amount of a liquid metal phase, of an assembly of metal parts, said parts being in intimate contact, which comprises heating said assembly to a temperature at which interdiffusion between said parts takes place while said assembly is immersed in a suitable, non-metallic, inorganic melt at atmospheric pressure and maintaining said heating with said melt at atmospheric pressure for a period of time sufficient to provide a satisfactory bond, said parts being particles of metal powder or metal fiber and said melt consisting essentially of one or more oxides or a glass, and cooling said assembly after said heating to produce a sintered metal article having an oxide or a glass dispersed therein.

* * * * *